United States Patent
Khramov et al.

(10) Patent No.: US 12,552,977 B2
(45) Date of Patent: Feb. 17, 2026

(54) POLYMER-BASED ADDITIVES FOR SHALE STABILIZATIONS, WELLBORE FLUID COMPOSITIONS COMPRISING SAID ADDITIVES, AND METHODS OF PRODUCING SAID COMPOSITIONS AND IMPROVING SHALE STABILIZATIONS USING SAID COMPOSITIONS

(71) Applicant: Schlumberger Technology Corporation, Sugar Land, TX (US)

(72) Inventors: Dimitri Khramov, Katy, TX (US); Balakrishnan Panamarathupalayam, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/494,496

(22) Filed: Oct. 25, 2023

(65) Prior Publication Data

US 2025/0136856 A1  May 1, 2025

(51) Int. Cl.
*C09K 8/24* (2006.01)

(52) U.S. Cl.
CPC ..................... *C09K 8/24* (2013.01)

(58) Field of Classification Search
CPC ...................................... C09K 8/62
See application file for complete search history.

(56) References Cited

U.S. PATENT DOCUMENTS

| | | | |
|---|---|---|---|
| 4,794,140 A | 12/1988 | Alexander | |
| 8,889,602 B2 | 11/2014 | Cliffe | |
| 10,968,380 B2 | 4/2021 | Panamarathupalayam | |
| 11,795,366 B2 | 10/2023 | Panamarathupalayam | |
| 11,795,369 B2 | 10/2023 | Panamarathupalayam | |
| 2004/0220058 A1 | 11/2004 | Eoff | |
| 2012/0285689 A1* | 11/2012 | Weaver | C09K 8/68 166/305.1 |
| 2014/0128295 A1* | 5/2014 | Wagles | C09K 8/08 507/111 |
| 2017/0145282 A1* | 5/2017 | Shumway | C04B 24/121 |
| 2023/0002664 A1* | 1/2023 | Chavan | C09K 8/035 |
| 2024/0158687 A1 | 5/2024 | Panamarathupalayam | |

FOREIGN PATENT DOCUMENTS

| | | |
|---|---|---|
| JP | 2000192026 A | 7/2000 |
| WO | 9603474 A1 | 2/1996 |
| WO | 2019108560 A1 | 6/2019 |
| WO | 2023055905 A1 | 4/2023 |

OTHER PUBLICATIONS

Polyvinylpyrrolidone Polymer Brochure (Year: 2014).*

* cited by examiner

*Primary Examiner* — William D Hutton, Jr.
*Assistant Examiner* — Avi K Skaist
(74) *Attorney, Agent, or Firm* — Jeffrey D. Frantz (57) ABSTRACT

Polymer-based additives improve shale stabilizations by being incorporated into wellbore fluid compositions for one or more wellbore operations or applications. Methods of producing said compositions and using said compositions to stabilize shale associated with wellbores disposed within subterranean formations are also provided. Wellbore fluid compositions comprising aqueous base fluids and the polymer-based additives and methods of introducing or circulating said compositions into the wellbores for stabilizing shales associated with the wellbores are further provided.

16 Claims, 3 Drawing Sheets

POLYMER-BASED ADDITIVES FOR SHALE STABILIZATIONS, WELLBORE FLUID COMPOSITIONS COMPRISING SAID ADDITIVES, AND METHODS OF PRODUCING SAID COMPOSITIONS AND IMPROVING SHALE STABILIZATIONS USING SAID COMPOSITIONS

FIELD OF THE DISCLOSURE

The disclosure generally relates to polymer-based additives for improving shale stabilizations, wellbore fluid compositions comprising said additives, and methods of producing said compositions and using said compositions to stabilize shale associated with wellbores disposed within subterranean formations. The disclosure also relates to wellbore fluid compositions comprising aqueous base fluids and the polymer-based additives and methods of introducing or circulating said compositions into the wellbores for stabilizing shales associated with the wellbores.

BACKGROUND

The statements in this section merely provide background information related to the present disclosure and do not constitute prior art.

It is known that production of hydrocarbons found in subterranean formations is generally accomplished through the use of rotary drilling technology, which requires the drilling, completing and working over of wellbores penetrating the formations. To facilitate the drilling of a wellbore into a formation, at least one wellbore fluid is circulated through the drill string, out the bit and upward in an annular area between the drill string and the wall of the borehole. Wellbore fluids are commonly used for: lubrication and cooling of drill bit cutting surfaces while drilling generally or drilling-in; transportation of drill cuttings to the surface; controlling formation fluid pressure to prevent blowouts; maintaining wellbore stability; suspending solids in the wellbore; minimizing fluid loss into and stabilizing the formation through which the wellbore is being drilled; fracturing the formation in the vicinity of the wellbore; displacing the wellbore fluid within the wellbore with another wellbore fluid; cleaning the wellbore; testing the wellbore; transmitting hydraulic horsepower to the drill bit; emplacing a packer within the wellbore; abandoning the wellbore or preparing the wellbore for abandonment; and otherwise treating the wellbore or the formation.

The selection of the type of wellbore fluid to be used in a wellbore drilling operation often requires a balance of both the good and bad characteristics of the wellbore fluids in the particular operation and/or the type of wellbore to be drilled. However, historically, aqueous-based wellbore fluids have been used to drill wellbores into formation. The lower costs and/or better environment acceptance associated with aqueous-based wellbore fluids typically to make them the first and/or better fluid option in when drilling operations when directly compared to oil-based wellbore fluids. Frequently, the selection of the wellbore fluid may depend on the type of formation through which the wellbore is being drilled.

The types of subterranean formations intersected by a wellbore, include sandstone, limestone, shale, siltstone, etc.; however, many of these types often are at least partly composed of clays, including shales, mudstones, siltstones, and claystones. Shale is the most common, and certainly the most troublesome and costly, rock type that must be drilled in order to reach oil and gas deposits in formations. The characteristic that makes shales most troublesome to drillers is its water sensitivity, due in part to its shale or clay content and the ionic composition of the shale or clay.

Often, many problems are encountered when drilling through such shale- or clay containing formations which may include: bit balling; swelling or sloughing of the wellbore; stuck pipe; and/or dispersion of drill cuttings. This may be particularly true when drilling with an aqueous-based fluid due to the high reactivity of shale or clay in an aqueous environment. When dry, the shale or clay has too little water to stick together, and it is thus a friable and brittle solid. Conversely, in an aqueous zone, the shale or clay material is essentially liquid-like with very little inherent strength and can be washed away. However, intermediate to these aqueous zones, the shale or clay is a sticky plastic solid with greatly increased agglomeration properties and inherent strength.

It is known that, as the drill bit teeth penetrate the formation, drill chips are generated by the action of the bit when drilling through such formations. When these cuttings are exposed to conventional aqueous-based fluids, the cuttings usually imbibe water and are rapidly dispersed. However, advances in wellbore fluid technology have developed highly inhibitive muds which appear to reduce the hydration of shale and in doing so produce sticky, plastic shale fragments. These fragments adhere to each other and to the bottomhole assembly and cutting surfaces of the drill bit and gradually forming a large compacted mass of clay on the drilling equipment. This process, or phenomenon, of accumulation and impacting is generally referred to as "balling" or "packing off" of the drilling equipment.

Typically, clay swelling during the wellbore drilling operations has a substantially adverse impact on wellbore drilling operations. Bit balling reduces the efficiency of the drilling process because the drillstring may eventually become locked and/or the drilling equipment may skid on the bottom of the hole preventing it from penetrating uncut rock; therefore, the rate of penetration may be substantially reduced or eventually terminated. An overall increase in bulk volume accompanying clay swelling often impacts the stability of the borehole or wellbore and/or impedes removal of cuttings from beneath the drill bit, which increases friction between the drill bit and the sides of the borehole and/or inhibits formation of the thin filter cake that seals formations. Clay swelling can also create other drilling problems, such as, for example, loss of circulation or stuck pipe and/or increased viscosity of the wellbore fluid that slow drilling and increase drilling costs. The downtime associated with either soaking the bit or tripping the bit is very costly and is therefore substantially undesirable.

In view of the foregoing and given the frequency in which shale is encountered in drilling subterranean wells, there exists several known techniques that may reduce potential problems encountered when drilling through shales. One known technique is shale encapsulation, wherein a special formulated wellbore fluid comprising polymer, surfactants, and optional additives is utilized to stabilize the shale by encapsulating the shale and/or creating a seal around the wellbore or at least one or more portions of the wellbore. Chemical bonding involved in shale encapsulation typically occurs through the interaction between the special formulated wellbore fluid and the surfaces of the shale-containing formation, wherein one or more functional groups of the polymer and/or surfactants form covalent or ionic bonds with the mineral surfaces of the shale-containing formation. For example, the special formulated wellbore fluid may contain positively charged polymer or surfactants that form ionic bonds with the negatively charged clay surfaces of the shale-containing formation and/or the polymer or surfactant molecules adsorb onto the clay surface and form a stable monolayer to stabilize the shale or clay.

It is also known that one or more polymers are usable in a water-based drilling fluid (hereinafter "WBM") as shale stabilizers and encapsulate the shale at the surfaces of the shale-containing formation. Current polymers used as encapsulators of shale include partially esterified acrylic acids and cationic acrylamides. However, improved polymers are desirable for WBMs, comprising the improved polymers, to work and/or function as well or effective as oil-based wellbore fluids or muds (hereinafter "OBM") such that the improved polymeric encapsulators contribute to overall shale stability. Current polymers have one or more issues with tolerances to water hardness and contributing to excessive viscosities in high density wellbore fluids or muds with high low-gravity solid (hereinafter "LGS") contents.

In contrast to the known polymers, the polymer-based additives for shale stabilizations, the wellbore fluid compositions comprising said additives, and the methods of producing said compositions and improving shale stabilizations using said compositions as disclosed herein provide solutions to the issues associated with the known polymers and solves unmet needs of improved shale stabilizations without large contributions to the viscosities of the wellbore fluid compositions.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, a wellbore fluid composition is provided and comprises an aqueous base fluid and one or more polymer-based additives comprising at least one polymer-based shale stabilizer, at least one polymer-based shale encapsulator, or a combination thereof, wherein a concentration of the one or more polymer-based additives is about 0.1 wt. % to about 20.0 wt. %, calculated to a total weight of the wellbore fluid composition.

In an embodiment, the one or more polymer-based additives comprise at least one polyvinylpyrrolidone as the at least one polymer-based shale stabilizer, wherein the at least one polyvinylpyrrolidone has a molecular weight greater than about 500,000 dalton.

In an embodiment, the molecular weight of the at one polyvinylpyrrolidones is at least about 1,300,000 dalton.

In an embodiment, the one or more polymer-based additives comprises the at least one polymer-based shale stabilizer being at least one polyvinylpyrrolidone copolymer with acrylamide or acrylic acid having a molecular weight of no more than about 450,000 dalton.

In an embodiment, the molecular weight of the at least one polymer-based shale stabilizer is no more than about 300,000 dalton or about 200,000 dalton.

In an embodiment, the molecular weight of the at least one polymer-based shale stabilizer in at least about 50,000 dalton.

In an embodiment, the at least one polymer-based shale stabilizer is at least one polyvinylpyrrolidone copolymer with acrylic acid.

In an embodiment, the one or more polymer-based additives comprises the at least one polymer-based shale encapsulator being polyacrylic acid having a molecular weight ranging from about 100,000 to about 300,000 dalton.

In an embodiment, the molecular weight of the one or more polymer-based additives ranges from about 150,000 to about 200,000 dalton.

In an embodiment, the one or more polymer-based additives comprise partially neutralized polyacrylic acid or polyacrylate salts of monovalent cations.

In an embodiment, the one or more polymer-based additive comprise the at least one polymer-based shale encapsulator being partially hydrolyzed polyacrylamide having molecular weight of less than about 300,000 dalton.

In an embodiment, the one or more polymer-based additive has an acid mole fraction of at least about 5%.

In an embodiment, the acid mole fraction of the one or more polymer-based additives is greater than about 10%.

In an embodiment, the one or more polymer-based additives are at least one copolymer comprising one or more copolymers of acrylic acid and/or acrylamide with one or more hydrophobic monomers, wherein the one or more hydrophobic monomers is more hydrophobic than the one or more copolymer of acrylic acid and/or acrylamide.

In an embodiment, the at least one copolymer is dimethylacrylamide, N-isopropylacrylamide, or a combination thereof.

In an embodiment, the one or more polymer-based additives comprise one or more cationic acrylamide monomers with pendant amine or quaternary groups having a total molecular weight of less than about 300,000 dalton.

In an embodiment, the one or more polymer-based additives comprise the at least one polymer-based shale encapsulator being one or more copolymers of vinylpyrrolidone with acrylamide or acrylic acid.

In one or more embodiments, a method is provided and comprises circulating the wellbore fluid composition disclosed herein into a wellbore disposed within a clay-containing subterranean formation.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." As used herein, the phrases "selected from the group consisting of," "chosen from," and the like include mixtures of the specified compounds and/or materials. Terms, such as, for example, "contains" and the like are meant to include "including at least" unless otherwise specifically noted.

Herein, the term "about" when applied to a value generally means within the tolerance range of the equipment used to produce the value, or in some examples, means plus or minus 20%, plus or minus 15%, plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Where a numerical limit or range is stated, the endpoints are included. Also, all values and subranges within a numerical limit or range are specifically included as if explicitly written out. Moreover, examples herein are intended to be illustrative only and are presented for discussion purposes and not by way of limitation.

Embodiments disclosed herein relate to one or more polymer-based additives and/or one or more polymer additives (collectively referred to hereinafter as "the polymer additive") for improving one or more shale stabilizations. Additionally, one or more wellbore fluids and/or one or more wellbore fluid compositions (hereinafter "the wellbore fluid") disclosed herein may comprise the polymer additive for improving at least one shale stabilization. Further, one or more methods disclosed herein (hereinafter "the methods") may produce and/or provide the wellbore fluid comprising the polymer additive. In some embodiments, the methods may utilize the wellbore fluid in one or more wellbores (hereinafter "the wellbore") disposed or formed within one or more subterranean formations (hereinafter "the formation") to stabilize one or more shales associated with the wellbore and/or the formation (hereinafter "the shale"). The present disclosure also relates wellbore fluids and/or wellbore fluids compositions comprising one or more water-based fluids, aqueous-based fluids, one or more water base fluids, and/or one or more aqueous base fluids (collectively referred to hereinafter as "the base fluid") and the polymer additive for stabilizing the shale and/or one or more methods of introducing or circulating the wellbore fluids into the wellbores for stabilizing the shales associated with the wellbores and/or the formations.

In one or more embodiments, the polymer additive disclosed herein may improve the stabilization of the shale within the formation and/or comprise one or more polymer-based shale stabilizers, one or more polymer-based shale encapsulators, or a combination thereof (collectively referred to hereinafter as "the shale encapsulator"). In some embodiments, the shale encapsulator may be, comprise, or consist of: one or more polyacrylic acids having specific or first molecular weight ranges; one or more copolymers of one or more acrylic acids, one or more acrylamides, and one or more optional monomers, having specific or first acrylic acid contents; one or more polyacrylamides; one or more polyvinylpyrrolidones; one or more sodium polyacrylates; one or more polyethylene oxides; or a combination thereof. The polymer additive or the shale encapsulator disclosed herein may be incorporated into the wellbore fluid for use in drilling the wellbore through the formation containing the shale which is swellable or may swell in the presence of water. The polymer additive or the shale encapsulator disclosed herein provide one or more good and/or improved encapsulation properties for the shale, unexpectedly improves compatibility of the shale encapsulator with one or more shale inhibitors, and/or surprisingly increases tolerances to water hardnesses.

In some embodiments, the one or more shale inhibitors utilized with or in the wellbore fluids and/or the methods disclosed herein may be, comprise, or consist of at least one amine-based shale inhibitor. In an embodiment, the wellbore fluid disclosed herein may comprise one or more amine-based shale inhibitors, the one or more amine-based shale inhibitors may include, hexamethylenediamine, bishexamethylenediamine, or a combination thereof. Further, the methods disclosed herein may introduce or circulate the wellbore fluid, the polymer additive, the shale encapsulator, and/or the one or more amine-based shale inhibitors into the wellbore during at least one wellbore drilling or completion operation and/or to stabilize the shale associated with the wellbore or formation. As a result, the wellbore fluid and/or the methods disclosed herein may improve stabilization of the shale and/or prevent or reduce water absorption by swellable shales and clays associated with the wellbore. In at least one embodiment, the one or more shale inhibitors disclosed herein may comprise at least two amine-based inhibition agents, and the wellbore fluid disclosed herein may comprise the base fluid, the polymer additive, the shale encapsulator, the one or more shale inhibitors, one or more rheological additives, or a mixture thereof.

In at least one aspect of the present disclosure, embodiments herein relate to the wellbore fluid for use in drilling the wellbore through a shale comprising the base fluid and the shale encapsulator. Generally, the wellbore fluid of the present disclosure may be formulated to include an aqueous continuous phase and the shale encapsulator which may be a water-soluble polymer-based additive. As disclosed below, the wellbore fluid disclosed herein may optionally comprise or include additional components or additives, such as weighting agents, viscosity agents, fluid loss control agents, bridging agents, lubricants, corrosion inhibition agents, alkali reserve materials and buffering agents, surfactants and suspending agents, rate of penetration enhancing agents and the like that one of skill in the art would appreciate may be added to an aqueous-based wellbore fluid.

When added to aqueous wellbore fluids, the shale encapsulator disclosed herein may surprisingly reduce or prevent dispersion of drilled shale or clay cuttings into the wellbore fluid. Further, the wellbore fluid comprising the shale encapsulator disclosed herein may surprisingly provide control over accretion and/or agglomeration of clay or shale cuttings.

At least one characteristic that makes shales most troublesome to drilling and/or completion operations is its water sensitivity, due in part to its clay content and the ionic composition of the clay. These reactive shales contain clays that have been dehydrated over geologic time by overburden pressure and formation temperature. When the shale is exposed during the drilling and/or completion processes, the clays osmotically imbibe water from the wellbore fluid used for drilling and/or completing the wellbore. Clay minerals are generally crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces. Each unit layer is composed of multiple sheets, which may include octahedral sheets and tetrahedral sheets. Octahedral sheets are composed of either aluminum or magnesium atoms octahedrally coordinated with the oxygen atoms of hydroxyls, whereas tetrahedral sheets consist of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms. The unit layers stack together face-to-face and are held in place by weak attractive forces. The distance between corresponding planes in adjacent unit layers is called the d-spacing. A clay crystal structure with a unit layer consisting of three sheets typically has a d-spacing of about $9.5 \times 10^{-7}$ mm.

In clay mineral crystals, atoms having different valences commonly will be positioned within the sheets of the structure to create a negative potential at the surface, which causes cations to be adsorbed thereto. These adsorbed cations are called exchangeable cations because they may chemically trade places with other cations when the clay crystal is suspended in water. In addition, ions may also be adsorbed on the clay crystal edges and exchange with other ions in the water. Exchangeable cations found in clay minerals are reported to have a significant impact on the amount of swelling that takes place. The exchangeable cations compete with water molecules for the available reactive sites in the clay structure. Generally, cations with high valences are more strongly adsorbed than ones with low valences. Thus, clays with low valence exchangeable cations will swell more than clays whose exchangeable cations have high valences.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's d-spacing thus resulting in an increase in volume. Two types of swelling may occur: surface hydration and osmotic swelling. Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers, which results in an increased d-spacing. Virtually all types of clays swell in this manner. Osmotic swelling is a second type of swelling. Where the concentration of cations between unit layers in a clay mineral is higher than the cation concentration in the surrounding water, water is osmotically drawn between the unit layers and the d-spacing is increased. Osmotic swelling results in larger overall volume increases than surface hydration. However, only certain clays, like sodium montmorillonite, swell in this manner.

When water molecules enter the lattice structure and bond with active sites, the layers expand or eventually disperse into individual particles. Dispersion of clay increases the surface area which causes the clay-water site to expand, and the clay-water suspension to thicken. This leads to swelling of the shale, induced stresses, loss of mechanical strength, and shale failure. Stress increases can induce brittle or tensile failure of the formations, leading to sloughing, cave in, and stuck pipe. Volume increases reduce the mechanical strength of shales and cause swelling of wellbore, disintegration of cuttings in drilling fluid. Shale failure may lead to shale crumbling into the borehole which places an undue burden on the drill bit. For example, the swelled excavated earth may adhere to the walls of the wellbore and of the drilling equipment and form a compact hard mass which gradually fills the entire wellbore annulus thus reducing the effectiveness of the drilling bit.

Furthermore, shale cuttings which are partially hydrated are typically dispersed into the aqueous-based drilling fluid, or may become tacky and exhibit accretion and/or agglomeration. Dispersion of clay into the aqueous-based drilling fluid may cause the drilling fluid to thicken. Accretion is the mechanism whereby partially hydrated cuttings stick to parts of the bottomhole assembly and accumulate as a compact, layered deposit. This can have an appreciable adverse impact on the wellbore drilling operations disclosed herein. Deposits on the bottomhole assembly may reduce the efficiency of the drilling process or operation because the drillstring eventually becomes locked. This in turn may cause the drilling equipment to skid on the bottom of the hole preventing it from penetrating uncut rock, therefore slowing the rate of penetration. Also, partially hydrated shale cuttings may stick together or agglomerate forming clusters in the wellbore fluid disclosed herein. Agglomeration may lead to increases in plastic viscosity, yield point, and gel strength of the wellbore fluid disclosed herein.

Without wishing to be limited by theory, it is believed that the shale encapsulator in the wellbore fluid disclosed herein may act by coating and/or penetrating the shale or clay cuttings and changing the surface character of the cuttings. The shale cuttings coated by the shale encapsulator may be more strongly adsorbed to the shale surface and/or the surface of the coated shale presented to the well environment may be substantially non-ionic which may inhibit osmotic swelling and/or aid the retention of shale internal structure. Consequently swelling and disintegration is reduced. Furthermore, these coated shale cuttings may not tend to agglomerate and/or accretion and agglomeration may also be reduced.

In applications and/or the methods disclosed herein where the shale encapsulator may be added to the wellbore fluid to provide control over dispersion, accretion, and/or agglomeration of shale cuttings, the wellbore fluid may be prepared or provided in a wide variety of formulations. Specific formulations may depend on the stage of drilling and/or completing at a particular time, for example, depending on the depth and/or the composition of the earthen formation. In at least one embodiment, the shale encapsulator may be added to the wellbore fluid as a polymer solution or a polymer suspension. In some embodiments, the polymer additive may be dissolved in a suitable solvent to form a polymer solution and then added to the wellbore fluid. In other embodiments, the polymer additive may not readily dissolve in the solvent of choice, and may be suspended or comminuted and suspended, in a suitable solvent, to form a polymer suspension which is then added to the wellbore fluid.

In one or more embodiments, the polymer additive or the shale encapsulator may be present in the wellbore fluid at a concentration ranging from about 0.1 wt. % to about 20.0 wt. %, from about 0.2 wt. % to 10.0 wt. %, from about 0.3 wt. % to about 5.0 wt %, or from about 0.5 wt. % to about 2.5 wt. %, wherein each wt. % concentration is based on a total weight of the wellbore fluid.

In some embodiments, the wellbore fluid comprising the shale encapsulator disclosed herein may be used as drilling and reservoir fluids as well as workover and completion fluids. Accordingly, all references to drilling fluids should be interpreted accordingly. In particular embodiments, the wellbore fluid is as a drilling or reservoir fluid.

The wellbore fluid of the present disclosure may have an aqueous fluid as the base fluid. The aqueous fluid or base fluid of the wellbore disclosed herein may include at least one of fresh water, sea water, brine, mixtures of water and water-soluble organic compounds and mixtures thereof. For example, the aqueous fluid or base fluid may be formulated with mixtures of desired salts in fresh water. Such salts may include, but are not limited to alkali metal chlorides, hydroxides, or carboxylates, for example. In various embodiments of the wellbore fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the wellbore fluids disclosed herein may be natural or synthetic, with synthetic brines tending to be much simpler in constitution. In one embodiment, the density of the wellbore fluid may be controlled by increasing the salt concentration in the brine (up to saturation). In a particular embodiment, a brine may include halide or carboxylate salts of monovalent cations of metals such as cesium, potassium, and/or sodium, and/or halide or carboxylate salts of divalent cations of metals, such as calcium, magnesium or zinc.

In one or more embodiments, other additives in addition to the polymer additive disclosed herein may be included in the wellbore fluid. For example, the other additives may be, comprise, or consist of one or more weighting agents, one or more viscosifiers, one or more wetting agents, one or more corrosion inhibitors, one or more oxygen scavengers, one or more anti-oxidants and free radical scavengers, one or more biocides, one or more surfactants, one or more dispersants, one or more interfacial tension reducers, one or more pH buffers, one or more mutual solvents, one or more thinning agents, or a combination thereof. In some embodiments, weighting agents or density materials suitable for use in the wellbore fluid disclosed herein include, for example, galena, hematite, magnetite, iron oxides, illmenite, barite, siderite, celestite, dolomite, calcite, a combination thereof and/or the like. The quantity of such material added, if any, depends upon the desired density of the final composition. Typically, weight material is added to result in a wellbore fluid density of up to about 19 pounds per gallon (hereinafter "ppg") in one embodiment; and ranging from about 8.5 or about 9.5 to about 14 ppg or about 15 ppg in another embodiment. Deflocculants or thinners of the wellbore fluid, when present, may be comprise, or consist of lignosulfonates, modified lignosulfonates, polyphosphates, tannins, and low molecular weight water soluble polymers, such as polyacrylates. Deflocculants are typically added to a wellbore fluid to reduce flow resistance and control gelation tendencies.

In some embodiments, the polymer additive or the shale encapsulator disclosed herein may be added to the base fluid of the wellbore fluid on location at the well-site where it is to be used, or it can be carried out at another location than the well-site. If the well-site location is selected for carrying out this step, then the polymer additive or the shale encapsulator may immediately be dispersed in a brine, and the resulting wellbore fluid may immediately be added to, emplaced in, or circulated into the wellbore using techniques known in the art.

When the polymer additive or the shale encapsulator may be added to the wellbore fluid at a "pre-manufacture" site remote from the well-site, the polymer additive or the shale encapsulator may be dispersed in a calcium-based brine, wherein the calcium concentration may be from about 1500 to about 3000 ppm. Further, one skilled in the art would appreciate that the polymer additive or shale encapsulator may also be provided in a heavier mud, which is then cut to the desired density at the well site. Alternatively, the polymer additive or the shale encapsulator disclosed herein may also be pre-formulated into a dry polymer particulate system, and provided for use at the well-site in user friendly packaging.

In one or more embodiments, the polymer additive or the shale encapsulator may be dissolved in the aqueous fluid or base fluid and/or supplied as a solution or in liquid form. The polymer additive or the shale encapsulator may be chosen to ensure that it is soluble in the aqueous base fluid, solution, or liquid from in the amounts required for the application in which it is to be used. Various factors can affect solubility of the polymer additive or the shale encapsulator. These may include molecular weights of the polymer additive or the shale encapsulator, acrylic acid contents of the polymer additive or the shale encapsulator, or a combination thereof.

In an embodiment, the wellbore fluid comprising the polymer additive or the shale encapsulator may be emplaced into the wellbore using conventional techniques known in the art. The polymer additive or the shale encapsulator may be added to at least one drilling fluid, at least one completion fluid, at least one workover fluid, or a combination thereof (collectively referred to hereinafter as "wellbore fluid"). The wellbore fluid described herein may be used in conjunction with any downhole operation, such as, for example, at least one drilling operation, at least one completion operation, or a combination thereof. For example, use of the wellbore fluid comprising the shale encapsulator disclosed herein during at least one drilling operation may be effective in preventing dispersion of shale cuttings into the wellbore fluid. Additional, the wellbore fluid comprising the shale encapsulator may be effective in preventing accretion and/or agglomeration of shale cuttings downhole. Further, the wellbore fluid comprising the shale encapsulator may be inherently biodegradable when compared to known shale stabilizers and/or encapsulators. The polymer additive or the shale encapsulator disclosed herein may also be inherently biodegradable. Specifically, the discrete portions of the polymer found along the polymer backbone may render the polymer biodegradable by microbes under aerobic conditions.

In one or more embodiments, the polymer additive may be, comprise, or consist of one or more non-ionic shale stabilizers, one or more anionic acrylic encapsulators, or a combination thereof. In some embodiments, the one or more non-ionic shale stabilizers may be, comprise, or consist of one or more polyvinyl alcohols (hereinafter "PVA"), one or more polyethyleneoxides (hereinafter "PEO"), one or more polyvinylpyrrolidones (hereinafter "PVP"), or a combination thereof. The non-ionic character PEO may address and/or overcome issues associated with poor compatibility between anionic encapsulators and amine-based additives. However, PVA may have one or more issues with difficulties of dispersing or being dispersed in water. In contrast, acrylic polymers and copolymers may disperse very fast. Other non-ionic polymers, such as, for example, PEO may perform poorly or not as well as PVA or PVP which may be caused by compatibility issues between PEO and other additives and/or environmental conditions, such as, for example, salts and/or temperatures.

The one or more anionic acrylic encapsulators having a precise and/or specific first molecular weight may be optimal shale inhibitors because the one or more anionic acrylic encapsulators may be easy to make, and if certain conditions related to their structure are met then the one or more anionic acrylic encapsulators may not have compatibility issues with other mud components or additives. In some embodiments, the one or more anionic polyacrylic acids may be, comprise, or consist of at least one polyacrylamide, at least one substituted polyacrylamide, at least one vinylpyrrolidone, or a combination thereof, wherein molecular weights of the one or more anionic polyacrylic acids range from about 25,000 daltons (hereinafter "Da") to about 500,000 Da, from about 50,000 Da to about 400,000 Da, about 100,000 Da to about 250,000 Da, or about 125,000 Da to about 225,000 Da.

In some embodiments, the polymer additive or the shale encapsulator disclosed herein may be, comprise, or consist of: one or more polyacrylic acids having molecular weights ranging from about 25,000 Da to about 500,000 Da; one or more copolymers of at least one acrylic acid, at least one acrylamide, and one or more other monomers having an acrylic acid content that is greater than about 2 mole % or greater than about 15 mole %; or at least one combination thereof. In at least one embodiment molecular weights may range from about 50,000 Da to about 400,000 Da, from about 75,000 Da to about 350,000 Da, or from about 100,000 Da to about 200,000 or 300,000 Da. In an embodiment, the acrylic acid content may be greater than about 5 mole %, greater than about 10 mole %, no more than about 5 mole %, or between about 5 mole % and 10 mole %.

EXAMPLES

Example 1

Example 1 is directed to identification of effective polymer additives and/or shale encapsulators for stabilizing and/or encapsulating shales. An experimental test was completed by adding various polymer additives disclosed herein to 1% NaCl brine followed by addition of an amine shale inhibitor as disclosed herein. Experimental test results of Example 1 are set forth below in TABLE 1 and show that high molecular weight anionic polymers have one or more issues when mixed with the amine shale inhibitor. For example, one issue with the high molecular weight anionic polymers is their viscosity dropping when mixed with the amine shale inhibitor. As shown in TABLE 1, a variety of other polymer additives disclosed herein work very well as shale stabilizers and/or encapsulators.

TABLE 1

Results for ARNE shale inhibition in 90 minute rolling tests using different polymer additives disclosed herein.

| Polymer description | ppb polymer in 1% NaCl solution | Weight % polymer in brine | 600 rpm FANN35 at RT | 200 rpm FANN35 at RT | Change in viscosity upon addition of shale inhibitor to solution of polymer | Shale recovery (Arne). 90 min roll |
|---|---|---|---|---|---|---|
| 4,000,000 Da polyacrylic acid | 1 | 0.29% | 11 | 4 | 600 rpm 11-->3 | 42% |
| 1,000,000 Da polyacrylic acid | 1.05 | 0.30% | 13 | 5 | | 50% |
| 450,000 Da polyacrylic acid | 1.8 | 0.51% | 13 | 5 | 600 rpm 13-->6.5 | 82% |
| 200,000 Da polyacrylamide, 10% carboxy modified PHPA | 5 | 1.43% | 11 | 4 | | 99% |
| 5-6,000,000 Da polyacrylamide | 1.4 | 0.40% | 12.5 | 6 | 600 rpm 13-->12 | 103% |
| 106-110,000 Da polyvinyl alcohol | 7 | 2.00% | 13 | 4 | | 98% |
| 1,300,000 Da polyvinylpyrrolidone | 7 | 2.00% | 10 | 4 | | 100% |
| partially esterified polyacrylic acid, ~200K Dalton | 3 | 0.86% | 11 | 4 | 600 rpm 10-->7 | 75% |
| >5,000,000 Da polyethylene oxide | 0.54 | 0.15% | 11 | 5 | | 79% |
| 1,000,000 Da polyethylene oxide | 1.3 | 0.37% | 12 | 5 | | 68% |
| 100,000 Da polyethylene oxide | 10 | 2.86% | 14 | 5 | | 55% |
| 20,000 Da polyethylene oxide | 10 | 2.86% | 5 | 1 | | 49% |

As shown in TABLE 1, PVP at 1.3 million (hereinafter "M") Da molecular weight is an effective shale stabilizer according to the experimental test results. Also, even this high molecular weight PVP does not contribute to viscosity a lot-7 ppb polymer was used to match viscosity of other polymer additives, many of which required a lot less polymer additive. PVP may be an ideal and/or advantageous candidate for shale stabilization, but PVP is very high-cost or costly relative to polyacrylic acid, partially esterified and having a molecular weight of 200,000 Da. Another solution would be if polyacrylic acid could be used for shale stabilization, but some polyacrylic acids have issues as set forth in TABLE 1. Notably, high molecular weight polyacrylic acids do not work well and one of the possible reason for such poor performance(s) is high MW polymer negative interaction with other drilling fluid components (i.e., amines in this example but others too).

Example 2

Example 2 is directed to polymer additives disclosed herein that may solve issues with amine/calcium tolerance with acrylic acid but may cause issues of too high molecular weight of polyacrylamide.

One method to improve encapsulator tolerance towards other mud components and/or amines and maintain reasonable cost may be to use at least one non-changed polymer, such as, for example, at least polyacrylamide. However, while polyacrylamide provides good shale encapsulation (as shown in TABLE 1) and good compatibility with amine shale inhibitor, polyacrylamide performs poorly for solids tolerance. TABLE 2 set forth below shows resulting viscosity for polymer additives that were treated with solids (i.e., API evaluation base clay and MI Gel supreme) to simulate increased loading of low gravity solids. The experimental testing data set forth in TABLE 2 shows that PVP, polyacrylic acid, partially esterified and having a molecular weight of 200,000 Da, and polyethylene oxide have low viscosity while Duo-vis and high MW polyacrylamide are very thick. Polyacrylamide mud had an appearance of flocculation of solids which is typically not desirable.

TABLE 2

Polymer solutions from that were treated with 70 ppb
API evaluation base clay and 35 ppb sodium bentonite.

| sample | polymer | 600 rpm on fann35 at RT A (polymer + 2 vol % shale inhibitor) | 300 | 200 | 100 | 6 | 3 |
|---|---|---|---|---|---|---|---|
| 1 | partially esterified polyacrylic acid, ~200K Dalton | 24 | 9 | 6 | 4 | 1 | 1 |
| 3 | 1,3M da polyvinylpyrrolidone | 23 | 11 | 7 | 4 | 1 | 1 |
| 2 | 5-6M da Polyacrylamide | 84 | 50 | 33 | 17 | 5 | 4 |
| 4 | 1M Da polyethyleneoxide | 17 | 9 | 7 | 5 | 1 | 1 |

A shale recovery test was performed again for this LGS-contaminated fluids and the experimental testing data set forth TABLE 3 shows that PVP remains effective as shale stabilization and polyacrylamide loses its effectiveness. Therefore, PVP is effective in clean muds, not affected by LGS contents presence, and remains effective at shale stabilization after high concentration of LGS contents is present. Polyacrylamide is not a good shale stabilizer because it loses effectiveness when LGS contents are present.

TABLE 3

ARNE shale recovery (16 hours, 150 F. hot roll)
for LGS-treated fluids reported in TABLE 2.

| sample | polymer | polymer concentration | Shale recovery |
|---|---|---|---|
| 1 | IDCAP D | 3 | 40% |
| 3 | 1,3M da polyvinylpyrrolidone | 1.4 | 95% |
| 2 | 5-6M da Polyacrylamide | 7 | 42% |
| 4 | 1M Da polyethyleneoxide | 1.3 | 45% |
| 5 | Duo-Vis | 0.55 | 50% |

Example 3

Example 3 is directed to use of at least one copolymer of acrylamide-co-acrylic acid as a hybrid between polyacrylic acids that perform or work well and polyacrylamides that do not perform or work well. A copolymer example, set forth in TABLE 4 shows that partially hydrolyzed polyacrylamide (hereinafter "PHPA") is a reasonable alternative to polyacrylamide; however, the molecular weight of the PHPA needs or should be low enough to avoid polymer coagulation with LGS content. In this copolymer example, molecular weight of the PHP A is 200,000 Da.

TABLE 4

PHPA (copolymer) vs blank

| | | Ame recovery |
|---|---|---|
| 1 | blank | 81% |
| 2 | IDCAP D | 35% |
| 3 | 1.3M PVP | 91% |
| 4 | 200K PHPA (10% acid) | 76% |

Examples 4-6 are presented to highlight that if the molecular weight is limited to a narrow range (i.e., not to be confused with narrow range molecular weight aka narrow polydispersity index), then polymers of polyacrylate or polyacrylamide-co-acrylic acid will perform or work as shale encapsulators without issues such as LGS contents intolerance or hard water intolerance.

Example 4

Example 4 is directed to the limiting of or limitations to molecular weights of acrylic polymer (i.e., upper/lower ranges).

Figure 2:
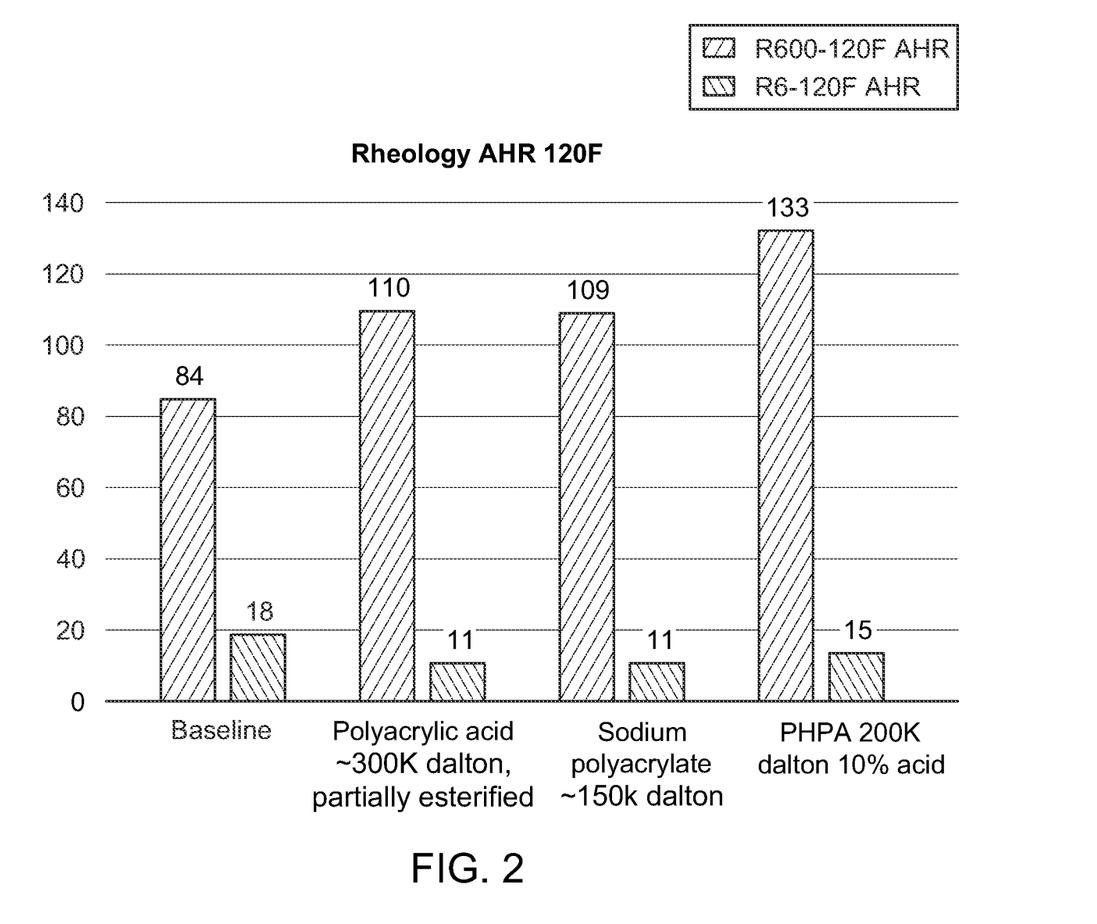
FIG. 2 illustrates graphical results of viscosity data for various polymer-based additives disclosed herein and a baseline, according to one or more examples of the present disclosure.

An experimental test was conducted in synthetic sea water by dissolving 3.5 wt % sea salt in water and adding 2 grams of polymer per 175 ml sample. 10 grams of Arne with 4-6 millimeters (hereinafter "mm") cuttings was added and the mixture was rolled for 10 minutes in 150 F oven after which Arne was recovered and weighted to measure dispersion of clay. The experimental testing results are shown in FIG. 2. Sodium polyacrylate is a polyacrylate polymer with molecular weight of approximately 100,000-350,000 Da. Polyacrylic acid at 450,000 Da molecular weight that was previously shown to perform or work (see TABLE 1) may not be suitable because it precipitated in sea water due to presence of calcium. Precipitation of acrylic acid at 450,000 Da shows incompatibilities with calcium and data for high MW acrylic acid incompatibilities with amine (viscosity reduction) set forth in TABLE 1 shows that to achieve encapsulation and compatibility with other mud components requires a careful and/or predetermined selection of molecular weight of the polymer additive(s). Polyacrylic acid, partially esterified and having a molecular weight of 200,000 Da showed some reduction in viscosity when combined with amine (see TABLE 1), Sodium polyacrylate did not show reduction in viscosity when mixed with amine. Combining the finding of calcium intolerance with other observations of polyacrylic acid molecular weight issues (TABLE 1) it may be said that molecular weight of polyacrylic acid should be limited to under 400,000 Da to achieve shale stabilization without compatibility issues. On the lower end, a test of shale dispersion using 10,000 Da polyacrylic acid was performed, wherein it was observed that shale dispersion increased. Low molecular weight polyacrylates are known to be dispersants to minerals and are used for that purpose; therefore, for maintaining cuttings integrity low molecular weight polymer will not work either.

To demonstrate acceptable solids tolerance of polyacrylates in the preferred molecular weight range and to highlight a solution to issues described in or associated with the date set forth in TABLE 2, a set of experiments were conducted to evaluate response of various encapsulators in a solids-laden mud. An example formulation set forth in TABLE 5. In this example formulation, polymer additives may increase R600 relative to baseline and drop R6 relative to baseline. Polyacrylic acid copolymers, such as, for example, partially esterified polyacrylic acid having a molecular weight of about 200,000 Da and polyacrylate, such as, for example, sodium polyacrylate having a molecular weight of about 150,000 Da behave similar, substantially the same, or the same.

TABLE 5

Formulation for at least one shale encapsulators disclosed herein.

| Product | Weight in grams |
| --- | --- |
| 20% NaCl | 307.21 |
| Amine shale inhibitor | 11.00 |
| polyacrylic acid, partially esterified and having a molecular weight of 200,000 Da | 0.00 |
| Fluid loss control starch | 2.00 |
| Xanthan | 1.00 |
| ROP enhancer and lubricant | 9.80 |
| API Clay | 20.00 |
| Barite | 203.6 |
| Vol, mL | 350 |
| Mw, ppg | 13.20 |

Figure 1:
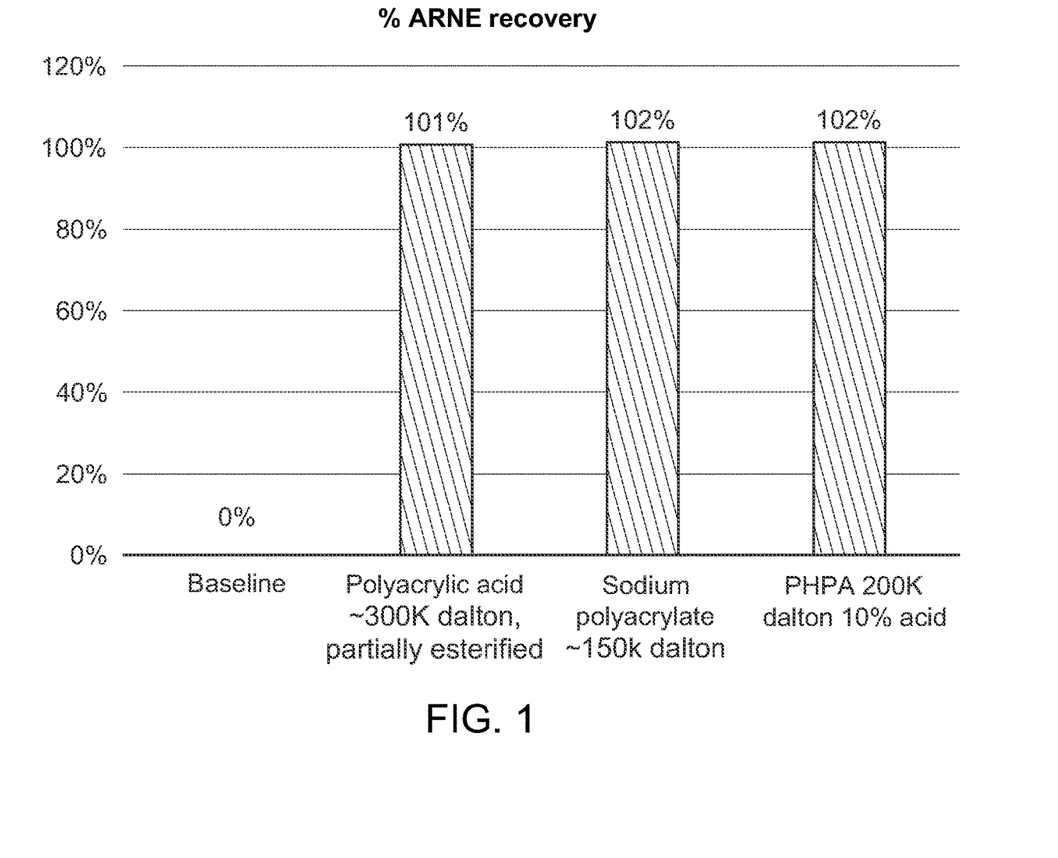
FIG. 1 illustrates graphical results of % ARNE clay recover for various polymer-based additives disclosed herein and a baseline, according to one or more examples of the present disclosure.

Additional testing was also completed with polyacrylic acid, such as, for example, polyacrylate with a molecular weight of about 180,000-200,000 Da. Both results were comparable to polyacrylic acid, partially esterified and having a molecular weight of 200,000 Da and sodium polyacrylate as shown in FIG. 1 without any incompatibility with sea water.

This experimental testing data set forth in FIG. 2 supports the finding that strictly limiting molecular weight of the acrylic polymers allows the acrylic polymers to provide encapsulation benefits without compatibility issues. Since it is now known that 450,000 Da polyacrylic acid precipitated in sea water but 240,000 Da polyacrylic acid did not, it means that upper range for the polymer may be somewhere in the range of 240,000-450,000 Da. Polyacrylic-co-acrylamide PHPA at 200,000 Da showed reasonable shale stabilization effect without building excessive viscosity in LGS-laden fluid suggesting that acrylamide copolymers are also effective provided their molecular weight is kept to lower end of the above-mentioned range. Since viscosity from PHPA was higher than for polyacrylic acids as shown in FIG. 2, it may be suggested that increased mole fraction of acrylic acid comonomer may be preferred with at least about 10% or about 20% or more.

Example 5

Figure 3:
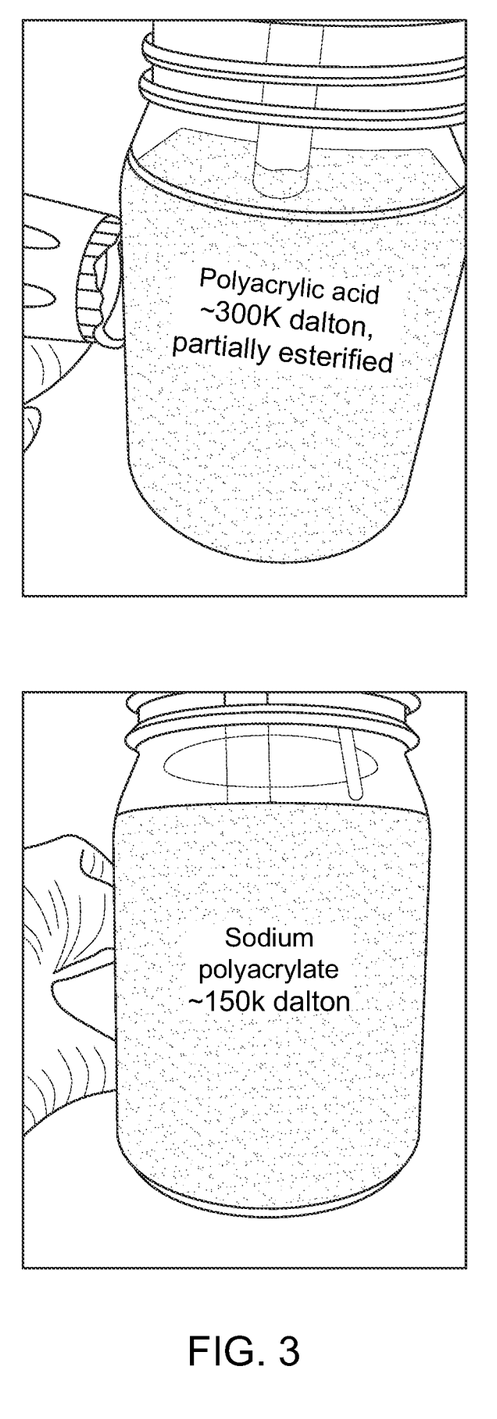
FIG. 3 comprises two illustrations that show similar or substantially the same calcium tolerances for two different polymer-based additives disclosed herein, according to one or more examples of the present disclosure.

Example 5 is directed to showing that effective encapsulator may be created without any ester co-monomer of polyacrylic acid ~300,000 Da, partially esterified which are copolymers of acrylic acid and an ester. Using said ester copolymers like this increases complexity and cost. In Example 5, it is shown that if molecular weight of polyacrylic acid is controlled to a certain range, then ester copolymer is not necessary which simplifies production and cost. As previously mentioned, 450,000 Da polyacrylic acid was incompatible with sea water and calcium caused polymer precipitation. A test was completed comparing hardness tolerance of polyacrylic acid, partially esterified and having a molecular weight of 200,000 Da to hardness tolerance of sodium polyacrylate with polyacrylic acid at molecular weight range of about 100,000 to about 300,000 Da. Polymer was first yielded in water and then calcium chloride solution was added dropwise until precipitate formed as shown in FIG. 3. Both polymers showed precipitation from about 2200 to about 2500 ppm calcium, i.e., similar or substantially the same. This experimental testing data shows that polyacrylic acid within a narrow range of average molecular weight of a sample Mn (i.e., narrow Mn range) shows similar hardness compatibility with a premium albeit expensive encapsulator, such as, for example, polyacrylic acid, partially esterified and having a molecular weight of 200,000 Da. Additionally, the experimental testing data shows that comparable tolerance to hardness is achievable without the expensive partial esterification process.

FIG. 3 shows that the calcium tolerances of polyacrylate polyacrylic acid at about 200,000 Da, partially esterified (see top illustration of FIG. 3) and sodium polyacrylate at about 150,000 Da (see bottom illustration of FIG. 3) at the end of titration are substantially similar or about the same.

TABLE 6

Performance summary of partially esterified polyacrylic acid, ~200K Dalton vs control vs sodium polyacrylate showing similar rheology in high density fluids with a lot of LGS.

| Product | Quantity (g/350 ml) |
|---|---|
| 1% NaCl | 211.35 |
| Amine-based shale inhibitor | 5.00 |
| Polymer | variable |
| Polyanionic cellulose FLC | 2.00 |
| Xanthan | 0.50 |
| ROP enhancer and lubricant | 7.00 |
| API Clay | 50.00 |
| M-I WATE | 438.4 |
| Vol, mL | 350 |
| Mw, ppg | 17.00 |

| Product | R600-120F AHR | R6-120F AHR |
|---|---|---|
| Control (no additive) | 173 | 42 |
| 1 ppb partially esterified polyacrylic acid, ~200K Dalton | 336 | 59 |
| 1 ppb sodium polyacrylate | 331 | 77 |

TABLE 6 shows that sodium polyacrylate at about 150,000 Da rheology is comparable to muds with polyacrylic acid at about 200,000 Da, partially esterified which supports the finding that a homopolymer of acrylic acid performs or works good, or at least satisfactory, if molecular weight is controlled to a specific first range.

Based on the experimental data set forth in FIG. 3 and TABLE 6, the shale encapsulator disclosed herein achieve one or more advantages and/or benefits. One benefit of sodium polyacrylate, or otherwise neutralized polymer or partially esterified polyacrylic acid with a molecular weight of about 200K Dalton, is that the pH of the mud may not require adjustment. It may be known that the pH of acrylic acid is low and substantially the same or the same is true for polyacrylic acid. For example, when the partially esterified polyacrylic acid is added the pH of the mud drops which subsequently needs to be adjusted. If the sodium polyacrylate disclosed herein is utilized, then the pH of the mud does not drop and adjustment of the pH is not necessary. Also, dispersion of sodium polyacrylate is easier and there is no "fish eyes" formation which may form with the partially esterified polyacrylic acid. It may be known that some additives may not exhibit good or satisfactory buffering at pH~9. However, some known shale inhibitor may be necessary or preferred and resolving issues with respect to the pH drop when adding encapsulator may be required. Thus, choosing to add sodium salts of polyacrylic acid may be advantageous and addition of the partially esterified polyacrylic acid may be beneficial and/or advantageous and may provide at least one solution with respect to the pH control challenge.

TABLE 7

Viscosity of some polymers that work as effective shale encapsulators (5 wt % in solution, at pH values of 7-11).

| Polymer | Viscosity Cps |
|---|---|
| polyacrylic acid ~200K dalton, partially esterified without pH adjust* | 100 |
| polyacrylic acid ~200K dalton, partially esterified | 120 |
| sodium polyacrylate ~150K dalton | 103 |
| PHPA ~200K dalton MW, 10% acid | 68 |
| Polyacrylic acid 450K dalton | 885 |

Example 6

Example 6 is other suitable co-monomers to be included in copolymer additives. Besides suitable polymers of acrylic acid and copolymer like poly(acrylic-co-acrylamide) other systems may be advantageous. For example, copolymer of acrylic acid and PVP may be advantageous. To further expand on suitable co-monomers, other acrylic polymers were tested since PVP is very expensive and costly. PVP has structural similarities to polyacrylamide in that they both contain amide moiety on a carbon-carbon bond backbone, but PVP is more hydrophobic due to its alkyl chain. This means that modifications to common and inexpensive acrylamides are also workable as shale encapsulators. As alternatives to PVP, structurally similar chemistries may be deployed, such as, polyacrylamide with substitution on the amide moiety. Substitutions may be mono- or di-substitutions. Examples are dimethylacrylamide or methylacrylamide which may be homopolymerized or copolymerized with acrylamide to control inhibition properties of the polymer additive(s). A series of experimental testing was performed to measure encapsulation efficiency of these alternative chemistries. In the testing, 175 ml synthetic sea water (i.e., 3.5 wt % sea salt in water) and 2 grams of polymer was mixed, then 10 grams of Arne shale was added, and the mixture was rolled for 10 minutes. This protocol is a common and/or known test method to evaluate shale encapsulation effects. The experimental testing results are shown in TABLE 8. Poly(N-isopropyl) acrylamide is not water soluble and, therefore, the results are similar to a blank but other additives demonstrate acceptable results in reducing shale dispersion versus the blank. TABLE 8 shows examples of homopolymers with uncommon monomers. These are likely more expensive that regular acrylamide but can be incorporated in copolymers with acrylic acid or acrylamide to achieve good properties without excessive cost. Furthermore, while Poly(N-isopropyl) acrylamide is not water soluble and does not work as encapsulator as a homopolymer, copolymerization with acrylic acid or acrylamide, or other highly water-soluble monomers may improve its performance as shale encapsulator. Similarly, acrylamide may also be copolymerized with vinylpyrrolidone to make a cost-effective and high performing shale inhibitor.

TABLE 8

Arne dispersion test with different polymer additives.

| Product Name | Arne Shale Dispersion Test (Recovery %) |
|---|---|
| Blank (no polymer) | 70 |
| SNF FLA 9910 180-200K Dalton MW | 93 |
| PVP (Ashland PVP K-120) >1M Dalton MW | 102 |
| Poly(acrylic) acid 240K Dalton MW | 93 |
| Poly(methylacrylamide) | 94 |

TABLE 8-continued

Arne dispersion test with different polymer additives.

| Product Name | Arne Shale Dispersion Test (Recovery %) |
|---|---|
| Poly(N,N-dimethyl) acrylamide 150k Dalton MW | 86 |
| Poly(N-isopropyl) acrylamide 300K Dalton MW | 73 (polymer not soluble) |

Based on the analysis of molecular weight described above, it's likely that a range of co-polymers may be created using other co-polymerizable molecules. If molecular weight range is kept to about 100,000 to about 200,000 or about 300,000 Da, then encapsulator is less likely to have issues with LGS contents in drilling fluids, less likely to have issues with cationic additives, and still be able to offer stabilizing effects. Several examples of monomers are listed in TABLE 8 which are used to tune hydrophobic/hydrophilic nature of encapsulator and may be used to adjust the density of hydrogen bonding in the polymer and, therefore, it's solution viscosity and ability to interact with shale. Additional monomers may include siloxane co-monomers such as VTMS (i.e., vinyltrimethoxysilane) which may improve adhesion to shale through the silane groups.

Some of the monomers mentioned above and/or set forth in TABLE 8 are thermally responsive monomers, such as, for example, isopropylacrylamide. Inclusion of this monomer causes the polymer additive to reduce in solubility as the temperature increases. Incorporation of thermally responsive monomers like isopropylacrylamide may provide further ability to tune the performance of the shale encapsulator or polymer additive.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A wellbore fluid composition, comprising:
    an aqueous base fluid;
    one or more polymer-based additives comprising at least one polymer-based shale stabilizer; and
    an amine-based shale inhibitor comprising hexamethylenediamine, bishexamethylenediamine, or a combination thereof;
    wherein a concentration of the one or more polymer-based additives is between about 0.1 wt. % and about 20.0 wt. %, calculated to a total weight of the wellbore fluid composition;
    wherein the one or more polymer-based additives comprise at least one polyvinylpyrrolidone as the at least one polymer-based shale stabilizer, wherein the at least one polyvinylpyrrolidone has a molecular weight between about 500,00 dalton and about 1,300,000 dalton; and
    wherein the at least one polyvinylpyrrolidone exhibits compatibility with the amine-based shale inhibitor with respect to a viscosity of the wellbore fluid composition.

2. The wellbore fluid composition of claim 1, wherein the one or more polymer-based additives further comprise at least one polyvinylpyrrolidone copolymer with acrylamide or acrylic acid.

3. The wellbore fluid composition of claim 2, wherein the at least one polyvinylpyrrolidone copolymer comprises acrylic acid.

4. The wellbore fluid composition of claim 1, wherein the one or more polymer-based additives further comprise at least one polymer-based shale encapsulator being polyacrylic acid having a molecular weight between about 100,000 dalton and about 300,000 dalton.

5. The wellbore fluid composition of claim 4, wherein the molecular weight of the polyacrylic acid is between about 150,000 dalton and about 200,000 dalton.

6. The wellbore fluid composition of claim 1, wherein the one or more polymer-based additives further comprise partially neutralized polyacrylic acid or polyacrylate salts of monovalent cations.

7. The wellbore fluid composition of claim 1, wherein the one or more polymer-based additives further comprise at least one polymer-based shale encapsulator being partially hydrolyzed polyacrylamide.

8. The wellbore fluid composition of claim 7, wherein the partially hydrolyzed polyacrylamide has an acid mole fraction of at least about 5%.

9. The wellbore fluid composition of claim 8, wherein the acid mole fraction of the partially hydrolyzed polyacrylamide is greater than about 10%.

10. The wellbore fluid composition of claim 1, wherein the one or more polymer-based additives further comprise at least one copolymer comprising one or more copolymers of acrylic acid and/or acrylamide with one or more hydrophobic monomers, wherein the one or more hydrophobic monomers is more hydrophobic than the one or more copolymers of acrylic acid and/or acrylamide.

11. The wellbore fluid composition of claim 10, wherein the at least one copolymer comprises dimethylacrylamide, N-isopropylacrylamide, or a combination thereof.

12. The wellbore fluid composition of claim 1, wherein the one or more polymer-based additives further comprise one or more cationic acrylamide monomers with pendant amine or quaternary groups.

13. The wellbore fluid composition of claim 1, wherein the one or more polymer-based additives further comprise at least one polymer-based shale encapsulator being one or more copolymers of vinylpyrrolidone with acrylamide or acrylic acid.

14. The wellbore fluid composition of claim 1, wherein the at least one polyvinylpyrrolidone has a molecular weight of about 1,300,000 dalton.

15. The wellbore fluid composition of claim 1, wherein the concentration of the one or more polymer-based additives is between about 0.5 wt. % and about 2.5 wt. %, calculated to the total weight of the wellbore fluid.

16. The wellbore fluid composition of claim 1, wherein:
the aqueous base fluid is brine;
the at least one polyvinylpyrrolidone has a molecular weight of about 1,300,000 dalton; and
the concentration of the at least one polyvinylpyrrolidone is 2.0 wt. %, calculated to a weight of the brine.

* * * * *